२,७१५,६०१

LACTASE ENZYME PREPARATION

Elliott R. Morgan, Bay Shore, N. Y., assignor to National Dairy Research Laboratories, Inc., Oakdale, N. Y., a corporation of Delaware No Drawing. Application June 17, 1953, Serial No. 362,393

4 Claims. (Cl. 195—67)

The present invention relates to the production of lactase enzyme and, more particularly, to a process of preparing an improved, lactase-active yeast product of bland flavor and good stability and to the product obtainable by this process.

The utilization of milk products in concentrated form has been limited heretofore by the low solubility of lactose in water. For example, skim milk cannot be stored if it is concentrated beyond a total solids content of 30%, for at higher concentrations large lactose crystals quickly are deposited. Similarly, there is an upper limit of solids concentration for both whole milk and whey beyond which lactose crystallization becomes a problem. Also, in the manufacture of ice cream the amount of milk solids-not-fat must be within the range from 10 to 10.5%, for at higher proportions lactose will crystallize on storage and produce a so-called "sandy" ice cream.

Crystallization of lactose is a serious problem, because it upsets the uniformity of the product and makes the product difficult to handle and use. The problem is further complicated by the difficulty experienced in redissolving lactose once it has crystallized.

For this reason, it has been proposed that the lactose present in milk be hydrolyzed to simple sugars more soluble in water than lactose through use of lactase enzyme. In such a process the lactase enzyme preparation is added to the milk, which is then incubated at an elevated temperature until the desired amount of hydrolysis has taken place.

If the lactase enzyme preparation is intended to be used in the hydrolysis of lactose to glucose, galactose and other sugars without converting the hydrolysis products to carbon dioxide and alcohol, it is essential that the lactase be uncontaminated with those yeast enzyme systems which convert glucose, galactose and other sugars to carbon dioxide and alcohol. These enzyme systems are collectively called zymase by the art, and the yeast lactase preparations of this invention must be zymase-inactive if conversion of glucose and galactose to carbon dioxide and alcohol is to be prevented.

It is also desirable, for obvious reasons, that lactase preparations which are to be used in the processing of food products for either animal or human consumption should be sterile, i. e., substantially free of bacteria and other viable organisms. If the amounts of bacteria and other viable organisms are excessively high, health hazards can result. The importance of minimizing the concentrations of viable organisms in a lactase enzyme preparation is evidenced by the fact that both the United States Department of Agriculture and the American Dry Milk Institute have established recommended quality standards for the bacterial count of various food products such as non-fat dry milk and dry buttermilk. Any product which exceeds the maximum bacterial count established by these agencies in considered to be unsanitary.

In addition to the facts that a lactase enzyme preparation should be zymase-inactive and should contain a minimum of bacteria and viable organisms, another desirable attribute is that of a good flavor.

It is an object of the present invention to provide an improved method of preparing a lactase enzyme preparation which can be employed to hydrolyze the lactose present in milk and produce a nearly or substantially lactose-free milk product of good flavor.

It is a further object of the invention to prepare a lactase enzyme preparation which has unusually low bacterial count.

It is another object of the invention is provide a process for preparing a lactase enzyme preparation of exceptionally good flavor.

It is still another object of the invention to prepare a lactase-active zymase-inactive yeast product of bland flavor and good stability which contains a low or substantially nil bacteria count.

The process of this invention constitutes an improvement in the production of a lactase enzyme preparation by propagating yeast of a lactase-producing strain under growth-favoring conditions in a nutrient medium in which lactose is the chief source of carbohydrate, which improvement comprises the step of recovering the lactase enzyme by treating the yeast with aqueous ethyl alcohol.

In accordance with the present invention, it has been found that when the yeast resulting from the propagation of yeast of a lactase-producing strain in a nutrient medium in which lactose is the chief source of carbohydrate is subjected to a treatment with ethyl alcohol within certain critical proportions of alcohol to yeast, the yeast and bacteria are substantially killed without decreasing the potency of the lactase enzyme. Furthermore, the process results in a lactase enzyme preparation having a substantially improved flavor.

Among the yeast strains which may be propagated to produce lactase are *Saccharomyces fragilis*, *Torulopsis spherica*, *Zygosaccharomyces lactis*, and strains of *Torula utilis* and *Candida pseudotropicalis*.

The ingredients and proportions thereof essential to any nutrient medium employed for the propagation of yeast and particularly yeasts of the above strains, are well known to those skilled in the art and details thereof need not be given here. It is important, however, that the nutrient media contain lactose as the chief source of carbohydrate. The total solids content of the nutrient medium should be between 2 and about 8%, preferably 3% and the pH should be approximately 4.5, but a satisfactory enzyme preparation can be obtained by employing a nutrient medium whose pH lies in the range of 3.5 to 7.5.

The nutrient medium may be prepared synthetically, for example, by dissolving in water 0.5 to 5% lactose, 0.4% of some source of inorganic nitrogen, such as urea, ammonia, or diammonium phosphate, 1% peptone, 0.5% yeast extract, and other yeast nutrient materials. Usually it is more convenient, however, and less expensive, to employ as a base for the medium a natural product which contains all or a large proportion of the materials required for yeast growth, and to supply nutrients in which the material may be deficient. Well-known materials in plentiful supply which contain all yeast nutrient requirements except inorganic nitrogen are whey derived from cheese or casein manufacture, and the mother liquor wash water obtained as a waste product in the production of lactose from whey or milk products.

In Table I there is given the typical composition of some whey and whey derivatives useful as a base for the yeast nutrient medium:

Table I

|  | Cheddar Cheese Whey | Cream Cheese Whey | Casein Whey | Mother Liquor Wash Water |
|---|---|---|---|---|
|  | Percent | Percent | Percent | Percent |
| Total Solids | 3.0 | 3.0 | 3.0 | 3.0 |
| Lactate Ion | 0.11 | 0.26 |  |  |
| Acidity as lactic | 0.10 | 0.24 | 0.01 | 0.11 |
| Fat | 0.13 | 0.062 |  |  |
| Total Nitrogen | 0.055 | 0.04 | 0.022 | 0.04 |
| Lactose.H₂O | 2.23 | 2.11 | 2.74 | 1.5 |
| Amino Nitrogen | 0.013 | 0.02 | 0.01 | 0.019 |
| Ammonia | 0.013 | 0.026 | 0.002 |  |
| Urea | 0.0095 | 0.0056 |  |  |
| Calcium | 0.0215 | 0.0377 |  |  |
| Sodium | 0.0215 | 0.0175 |  |  |
| Potassium | 0.071 | 0.058 |  | 0.25 |
| Magnesium | 0.004 | 0.004 |  |  |
| Phosphate | 0.100 | 0.100 |  |  |
| Ash | 0.24 | 0.243 | 0.38 | 0.86 |

It has also been determined that it is important that the nutrient medium be pasteurized before the yeast is added thereto. Pasteurization may be brought about by heating the medium at 140 to 160° F. for 30 minutes or longer, or 165° F. for ½ hour, or at 170 to 190° F. or higher for 10 to 60 seconds.

Thereafter, while the whey is kept at an elevated pasteurization temperature, it is fortified with such additional yeast nutrient materials as may be required. It is desirable to add these materials at a pasteurization temperature in order to destroy bacteria contained therein. Some source of inorganic nitrogen should be added, say 0.2% urea, 0.14% ammonia, or 0.4% diammonium phosphate. Also, if desired, 0.1% cornsteep may be added. The solids content of the whey is then adjusted to within the range from 2 to 8%. Dependent upon the initial solids content, this may be accomplished either in the course of fortifying with additional solid nutrient material or by dilution with water or a solution of the added nutrient material.

Before addition of yeast, the nutrient medium is brought to a propagation temperature within the range of 80 to 100° F. An actively growing starter culture of the yeast in the nutritive medium then is added in an amount of 10% on the basis of the main batch of medium. This inoculation should give a main fermentation batch containing a cell count of 10 to 60 million yeast cells per ml. During fermentation the nutrient medium is held at a temperature within this range; a temperature of 86° F. is the optimum.

If no aeration is employed, 30 hours or more may be required for the fermentation. Therefore, in order to shorten the fermentation time it is desirable to aerate the nutrient medium. Aeration at a rate of 0.009 volume of air per volume of nutrient medium per minute will reduce the fermentation time to from 18 to 24 hours, while a higher aeration rate, of the order of 0.5 volume of air per volume of nutrient medium per minute, will further reduce the fermentation time to from 10 to 12 hours. In general, the higher the rate of aeration, within the range of aeration rates specified, the higher the yield of yeast. While an aeration rate within the range of 0.009 to 0.5 volume of air per volume of nutrient medium per minute is preferred, it will be understood that higher aeration rates may be employed to meet special requirements.

If, in addition to aeration, the nutrient medium is agitated vigorously, it is possible to further reduce the fermentation time to from 2 to 8 hours.

With a combination of aeration and agitation, it is possible to establish a continuous fermentation process in which the yield of yeast in a unit time is at least 10 times that of a batch process under similar growth-favoring conditions. In this process, nutrient medium is fed in at a constant rate to replenish exhausted nutrients, while fermented nutrient medium is withdrawn at a similar constant rate for the harvesting of yeast therefrom. Such a continuous process is particularly desirable from a commercial point of view.

The nutrient medium is the same as is used in a batch process, and preferably is derived from whey. In practice, the nutrient medium is inoculated with wet yeast cake in an amount equal to one to two billion yeast cells per cc. (0.7 to 1.4%, by weight of the medium based on the dry weight of the yeast added), and these cells are encouraged to grow at a maximum rate under optimum growth-favoring conditions of aeration (0.1 to 1 volume of air per volume of nutrient medium per minute), agitation (sufficient to give a dispersion of small air bubbles throughout the liquid), and temperature (80° to 100° F.) using proper rates of feeding in of nutrient medium and withdrawing of fermented liquors.

A yeast concentration of one to two billion cells per cc. represents approximately the maximum concentration which can be maintained without overcrowding. Therefore, it is desirable in a continuous process to maintain the concentration within this range by removing fermentation liquor continuously at the same rate at which fresh nutrient medium is added.

Yeast may be harvested from this withdrawn liquor continuously or from time to time, as desired. Spent liquors may be fortified with nutrients, and reused.

At 86° F., with proper agitation and aeration at a rate of 0.2 volume of air per volume of medium per minute, using a whey-base nutrient medium of 3% total solids, fortified with 0.4% diammonium phosphate, an initial inoculation of one billion actively growing S. fragilis yeast cells per cc. of medium, a continuous fermentation will double itself to form 2 billion yeast cells per cc. every 4 hours, whereas a batch fermentation under the same conditions would produce only 0.15% of yeast cells per ml. in the same time and not over 800 million yeast cells per ml. in 18 hours.

In any of the processes described herein the yeast may be harvested by any means, such as by filtration, to obtain a wet yeast cake which is then processed in accordance with the process of this invention. Dry yeast cake cannot be satisfactorily processed by the present invention because, upon drying, the walls of the yeast cells become permeable which allows the lactase enzyme to be extracted by the alcohol treatment.

In treating the yeast cake, the preferred procedure comprises suspending the yeast cake in aqueous ethyl alcohol in which the amount of alcohol is equal to from about 1.5 to about 3.6 times the weight of dry yeast solids, preferably from about 2 to 2.5 times the weight of dry yeast solids. For a wet yeast cake containing about 25% solids, the amount of alcohol relative to yeast cake should be from about 0.35 to about 0.9 times the weight of the yeast cake, preferably from 0.5 to 0.6 times the weight of the yeast cake.

The slurry is allowed to stand in the presence of the alcohol for a length of time sufficient to kill most of the viable organisms in the yeast without appreciably decreasing the lactase activity of the yeast. The time will generally vary from about 60 to about 300 minutes, longer times being required when the alcohol content is in the lower part of the range given above and shorter times being required when the alcohol is in the upper part of the range.

Thereafter, the yeast can be removed from the alcohol slurry by conventional means such as filtration or centrifuging, and can be dried by conventional methods such as freeze drying, tray drying or spray drying. The dried product will contain a minimum of viable organisms but the lactase activity of the product remains substantially unimpaired by the alcohol treatment while the zymase activity of the product is negligible.

The pH during the alcohol treatment is not critical. Generally, because of the nature of the yeast, the treatment will be performed in an acidic pH which normally falls in the neighborhood of 3.7. Very good results can be obtained at this pH and it is not necessary to alter the pH by addition of acid or alkali. Several experiments in which the pH was raised to 6.8 by the addition of potassium hydroxide gave slightly poorer results than treatment at a pH of 3.7 although the product was still improved.

The temperature during the alcohol treatment is likewise not critical. Generally, it is preferred to employ ordinary room temperatures because of the convenience and the excellent results obtained thereby. However, temperatures not appreciably lower or higher than room temperature are not harmful, but the lactase must not be destroyed. Generally, the temperature during the alcohol treatment will remain constant. However, any temperature between 40° F. and 110° F. may be used.

In the following examples, the lactase activity of the product was obtained in the following manner:

Forty grams (40 g.) of condensed skim milk having a solids content of 30% was placed in a sealed container which was then immersed in a constant temperature bath at 123° F. After the sample had reached the temperature of the bath, the lactase preparation was added in the ratio of 1 part of lactase preparation to 45 parts of lactose. The sample was then held at 123° F. for 4 hours. At the end of this time the percent hydrolysis of lactose was determined by the Tauber-Kleiner method for monose determination. Hereafter, lactase activity will be expressed as percent hydrolysis.

The following examples are given in order to illustrate the invention and its attendant advantages. Parts are by weight unless otherwise specified.

EXAMPLE 1

A quantity of yeast cake (25% solids) was obtained by the fermentation of lactose using *S. fragilis*. Individual samples of the yeast cake were suspended in water and sufficient aqueous alcohol was then added to each sample to give a predetermined concentration of alcohol. The container for each sample was then closed and the slurry was allowed to stand with stirring for a period of time at room temperature. Thereafter the yeast was centrifuged from the aqueous alcohol and the resulting yeast cake was freeze dried. The dried powder was then analyzed quantitatively for bacteria and tested for lactase activity. A control sample was processed in exactly the same manner except that the alcohol treatment was omitted. The following table presents the data obtained on the various samples of this example.

All of the remaining samples were processed in accordance with the invention and it is observed that each of the samples resulted in an acceptable product in which there occurred no loss in lactase activity and in which there approached a 100% kill of the viable organisms.

EXAMPLE 2

A quantity of yeast cake (25% solids) was obtained by the fermentation of lactose using *S. fragilis*. The yeast cake was resuspended in 88.25 parts of water and an amount of ethanol was added to give a concentration of 8 parts of ethanol and 3.75 parts of yeast solids. The resulting slurry was allowed to stand for 5 hours. Thereafter the solid matter was separated by filtration and spray dried to obtain a powdered product.

The following table shows the results obtained from the analysis of the product before and after the treatment with alcohol.

Table III.—Analysis of yeast before and after treatment with alcohol (calculated on 0% $H_2O$)

| | (Before Alcohol Treatment) | (After Alcohol Treatment) |
|---|---|---|
| Fat (Percent) | 4.22 | 3.96 |
| Total Nitrogen (Percent) | 9.82 | 10.16 |
| Nonprotein Nitrogen (Percent) | 1.26 | 1.21 |
| Lactase Activity (Percent Hydrolysis) | 68.0 | 68.0 |

The results indicate that there is no significant variation between the two samples from the standpoint of composition although the sample that was treated with alcohol showed a greater than 99% kill of viable organisms. The alcohol treatment resulted in no detectable loss in protein or nonprotein nitrogen, but instead, there seemed to be a slight gain in total nitrogen as a result of the alcohol treatment.

EXAMPLE 3

The procedure of Example 2 was repeated with the exception that the final product was tray dried instead of spray dried. The number of total organisms per gram of sample before alcohol treatment was 15,400,000,000. The total organisms per gram of sample after alcohol treatment was 3,800,000. Although the final concentration of organisms was high, there was effected a greater than 99% kill of the organisms.

Table II

| Sample | Treatment | | | | Effect on Bacteria | | | | Effect on Enzyme | |
|---|---|---|---|---|---|---|---|---|---|---|
| | Parts Yeast Solids | Parts Ethanol | Parts Water | Time in Min. | Viable Yeast/gm. | Percent Kill | Viable Bact./gm. | Percent Kill | Percent Activity | Percent Loss in Activity |
| 1 | 3.75 | 16 | 80.25 | 30 | 101,000 | 99.93 | 440,000 | 99.89 | 53 | 22 |
| 2 | 3.75 | 16 | 80.25 | 60 | 8,100 | 99.99 | 61,000 | 99.98 | 23 | 66 |
| 3 | 3.75 | 16 | 80.25 | 90 | 3,500 | 99.99 | 72,000 | 99.98 | 15 | 78 |
| 4 | 5.0 | 20 | 75.0 | 60 | 5,600 | 99.99 | 115,000 | 99.97 | 33 | 51 |
| 5 | 3.75 | 24 | 64.25 | 30 | 6,800 | 99.99 | 81,000 | 99.98 | 11 | 80 |
| 6 | 3.75 | 8 | 88.25 | 30 | 95,000 | 99.93 | 400,000 | 99.90 | 68 | 0 |
| 7 | 3.75 | 8 | 88.25 | 60 | 57,000 | 99.96 | 350,000 | 99.91 | 66 | 0 |
| 8 | 3.75 | 8 | 88.25 | 90 | 14,500 | 99.99 | 79,000 | 99.98 | 70 | 0 |
| 9 | 5.0 | 8 | 87. | 90 | 54,000 | 99.96 | 150,000 | 99.96 | 66 | 0 |
| 10 | 7.5 | 16 | 76.5 | 60 | 39,000 | 99.97 | 370,000 | 99.91 | 72 | 0 |
| 11 | 7.5 | 8 | 84.5 | 90 | 16,000 | 99.98 | 200,000 | 99.91 | 71 | 0 |
| Control | | | | | 152,000,000 | 0 | 390,000,000 | 0 | 68 | 0 |

From the data, it is obvious that samples 1, 2, 3, 4 and 5 were unacceptable because each of these samples suffered a severe loss in lactase activity even though the desired kill of the viable organisms occurred. Since in all of the unacceptable samples the ratio of alcohol to yeast solids exceeded the critical limits of this invention, it is thus shown that the ratio of alcohol to yeast solids is critical in obtaining an acceptable product.

EXAMPLE 4

A yeast cake analyzing 25% solids was treated with alcohol in a slurry containing 5 parts of yeast solids, 12.5 parts of alcohol and 82.5 parts of water. Thereafter the solid matter and the slurry were separated by filtration and the solids were tray dried. The lactase activity of the product was the same as that of the original yeast, i. e., 68%.

The following table presents a study of the storage stability of the product:

Table IV.—Storage study on alcohol treated, tray dried lactase preparation

| Storage Time (in weeks) | Storage Temp. | Percent Hyd. |
|---|---|---|
| 0 |  | 68 |
|  | 40° F | 65 |
| 2 | Room Temp | 48 |
|  | 100° F | 46 |
|  | 40° F | 65 |
| 12 | Room Temp | 4.5 |
|  | 100° F | 0 |
|  | 40° F | 60 |
| 29 | Room Temp | 0 |

The data in the table shows that the product can be stored for fairly long periods of time at low temperatures but that at room temperature and higher it suffers a decided loss in enzyme activity. For this reason, it is recommended that the product be stored under refrigeration.

EXAMPLE 5

The product of Example 2 was subjected to taste tests by a number of persons. Seventy-five percent of the tasters believed that the product of this invention had only one-half the objectionable flavor of a lactase enzyme preparation prepared without the alcohol treatment. The other twenty-five percent of the taste panel believed that the product of the invention had only one-fourth the objectionable flavor of the conventional enzyme preparation.

EXAMPLE 6

A quantity of yeast cake analyzing 25% solids was obtained by the fermentation of lactose by the organism S. fragilis. Individual samples of the yeast cake each containing 3.75 parts of yeast solids were treated with aqueous solutions containing varying weights of water and ethyl alcohol. In each case, the pH of the resulting slurry was 3.7. Additional samples were prepared in a similar manner except that a pH of 6.8 was obtained by the addition of 1.0 normal potassium hydroxide. Each of the samples were allowed to stand in the alcohol solution sixty minutes and thereafter the yeast cells were separated by centrifugation and freeze dried.

The following table shows the effect of varying the alcohol concentration and the pH during the alcohol treatment:

Table V.—The effect of pH on the yeast and bacterial population of several alcohol-treated samples

| Sample No. | Alcohol, Parts | Yeast Solids, Parts | Water, Parts | pH | Percent Kill Bacteria | Percent Kill Yeast |
|---|---|---|---|---|---|---|
| 1 | 4.0 | 3.75 | 92.25 | 3.7 | 95 | 95 |
| 2 | 4.0 | 3.75 | 92.25 | 6.8 | 78 | 47 |
| 3 | 6.0 | 3.75 | 90.25 | 3.7 | 97.5 | 97.5 |
| 4 | 6.0 | 3.75 | 90.25 | 6.8 | 95.2 | 94.6 |
| 5 | 8.0 | 3.75 | 88.25 | 3.7 | 99.4 | 99.3 |
| 6 | 8.0 | 3.75 | 88.25 | 6.8 | 96.8 | 91.0 |
| 7 | 10.5 | 3.75 | 85.75 | 3.7 | 98.8 | 97.2 |
| 8 | 10.5 | 3.75 | 85.75 | 6.8 | 96.8 | 96.3 |
| 9 | 12.0 | 3.75 | 84.25 | 3.7 | 99.9 | 99.8 |
| 10 | 12.0 | 3.75 | 84.25 | 6.8 | 95.4 | 94.3 |

The data in the table shows that treatment at a pH of 3.7 is much more effective than a treatment at a pH of 6.8 although even at the higher pH a very large percentage of viable organisms was killed.

In order to obtain the full benefit of the process of this invention, it is recommended that all of the usual sanitary precautions be employed in addition to the alcohol treatment. Such precautions include, for example, the thorough cleansing and sterilization of all the apparatus employed.

It is intended to cover all changes and modifications in the examples of this invention herein given for purposes of disclosure which do not constitute departure from the spirit and scope of the appended claims.

I claim:

1. A process for the recovery of an improved lactase-active, zymase-inactive enzyme preparation which comprises treating a lactase-active yeast of a lactase-producing strain with ethyl alcohol in an amount ranging from about 1.5 to about 3.6 times the weight of yeast solids until a substantial proportion of the viable organisms have been killed and drying the yeast to recover a lactase-active, zymase-inactive product.

2. A process for the recovery of a flavor-improved lactase-active, zymase-inactive enzyme preparation which comprises treating a cake of a lactase-active yeast of a lactase-producing strain with ethyl alcohol in an amount ranging from about 1.5 to about 3.6 times the weight of yeast solids until a substantial portion of the viable organisms have been killed, and drying the yeast to recover a lactase-active, zymase-inactive product of good stability.

3. A process for the recovery of a flavor-improved lactase-active, zymase-inactive enzyme preparation which comprises treating a cake of a lactase-active yeast of a lactase-producing strain with aqueous ethyl alcohol, the amount of alcohol ranging from about 1.5 to about 3.6 times the weight of yeast solids, until a substantial proportion of the viable organisms have been killed and drying the yeast to recover a zymase-inactive product having a lactase-activity substantially the same as the original yeast cake.

4. A process for the recovery of a flavor-improved lactase-active, zymase-inactive enzyme preparation which comprises slurrying a cake of a lactase-active yeast of a lactase-producing strain in an aqueous ethyl alcohol solution containing from about 8 to about 17.5% alcohol at a temperature of about 40 to about 110° F., the amount of ethyl alcohol in said solution ranging from about 1.5 to about 3.6 times the weight of yeast solids, until a substantial proportion of the viable organisms have been killed, and drying the yeast to recover a lactase-active, zymase-inactive product of good stability.

References Cited in the file of this patent

FOREIGN PATENTS 474,822    Great Britain _____ of 1936

OTHER REFERENCES

Waksman et al.: Enzymes, Williams and Wilkins, 1926, pages 183–184.